US006301348B1

United States Patent
Romo et al.

(10) Patent No.: US 6,301,348 B1
(45) Date of Patent: Oct. 9, 2001

(54) METHOD AND SYSTEM FOR CHANGING A DIRECTION OF ESTABLISHING A TELECOMMUNICATION CONNECTION

(75) Inventors: Jorma Romo; Jouni Ikonen, both of Helsinki (FI)

(73) Assignee: Sonera Oy, Helsinki (FI)

(*) Notice: Subject to any disclaimer, the term of this patent is extended or adjusted under 35 U.S.C. 154(b) by 0 days.

(21) Appl. No.: 09/117,652
(22) PCT Filed: Jan. 31, 1997
(86) PCT No.: PCT/FI97/00053
§ 371 Date: Sep. 1, 1998
§ 102(e) Date: Sep. 1, 1998
(87) PCT Pub. No.: WO97/28657
PCT Pub. Date: Aug. 7, 1997

(30) Foreign Application Priority Data

Feb. 2, 1996 (FI) .......................................... 960501

(51) Int. Cl.⁷ ................................................... H04M 3/42
(52) U.S. Cl. ........................................ 379/207.12; 379/229
(58) Field of Search ................................... 379/210, 211, 379/212, 209, 207, 229, 220, 221, 230

(56) References Cited

U.S. PATENT DOCUMENTS 5,473,630   12/1995   Penzias et al. .
5,661,790 * 8/1997 Hsu ................................ 379/207 X
5,987,112 * 11/1999 Chakravarti et al. ............ 379/207 X
6,088,436 * 7/2000 Mashinsky ......................... 379/207

FOREIGN PATENT DOCUMENTS

92/01350 * 1/1992 (WO) .
WO 93/229866  11/1998 (WO) .

OTHER PUBLICATIONS

"For Tokyo's Long–Distance Dialers: The United States Set the Tone" Washington Post Aug. 5, 1994.*
"Rome to Bonn via New Jersey" Business Week, Apr. 13, 1992.*
"How Overseas Callers can get Stateside Rates" Business Week, Dec. 2, 1991.*

* cited by examiner

Primary Examiner—Creighton Smith
(74) Attorney, Agent, or Firm—Cohen, Pontani, Lieberman & Pavane

(57) ABSTRACT

A method for changing a direction of establishing a telecommunication connection between a first subscriber and second subscriber. A subscriber node is connected via a connection to a service node to request the placement of a call to the second subscriber. Once the second subscriber is contacted, the service node contacts the first subscriber and a direct connection between the first and second subscriber is established.

8 Claims, 1 Drawing Sheet

Figure 1:
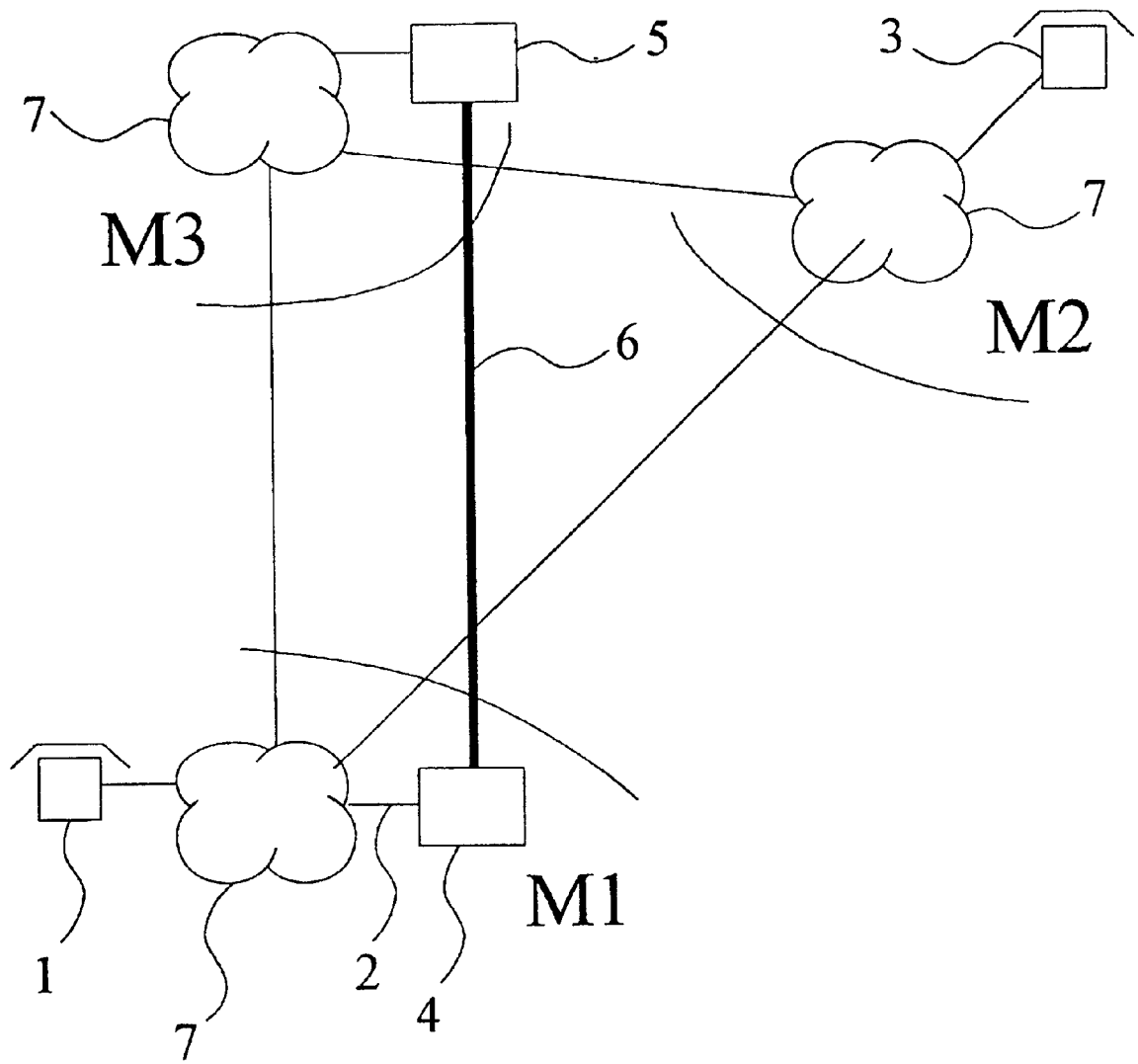

METHOD AND SYSTEM FOR CHANGING A DIRECTION OF ESTABLISHING A TELECOMMUNICATION CONNECTION

The invention relates to telecommunication networks. The invention relates particularly to a method and system for changing a direction of establishing a telecommunication connection in a telecommunication network in telecommunications between different countries.

The callback or recall service of known systems operates as follows. The A-subscriber calls to the call number of the recall service (service provider) and closes his phone without getting the answer for the call from the service system. Thereafter the service system checks the calling party's right of use for his database and calls back to the A-subscriber, to request the number of the foreign target. The service system then activates the connection to the called target or "C-subscriber" number and after receiving the answering signal, connects the calling A- and called C-subscribers to each other. If either party closes, the call is ended and the service system breaks both connections. The calling A-subscriber is charged for the connection times according to the service provider's own prices and not by the rates of the foreign operator in the calling A-subscriber's location country.

The recall service is effected nowadays generally as follows. The A-subscriber calls to the call number of the recall service and closes his phone without getting the answer for the call from the service system. Thereafter the service system checks the calling party's right of use for his data base and calls back to the A-subscriber who made the call. The service system asks the subscriber, to which foreign C-number he wants to call. After this the service system activates the connection to the called C-subscriber number and after receiving the answering signal connects the calling A-and called C-subscribers to each other. Is either party closes, the call is ended and the service system breaks both connections. The called A-subscriber is charged for the connection times according to the service operator's own prices and not by the rates of the foreign operator in the calling A-subscriber's location country.

Concerning the service operator, a connection is formed in this realization mode, when the service system establish a connection to the calling subscriber in order to ask the C-subscriber number. This is undesirable because the service operator must pay account fees for the connection time beginning from this moment to the foreign operator of the A-subscriber. If the calling attempt is not finally successful, e.g. the C-subscriber number is busy, this connection with the A-subscriber has caused expenditures for the service operator without any profits.

Another alternative comprises that the service offerer can minimize the duration of the supplementary accountable connection by breaking the connection needed for the inquiry of the C-subscriber number immediately after receiving the necessary data for the C-subscriber. Then the service offerer calls again to the calling A-subscriber after the called Csubscriber has answered. A weakness in this solution is that by the coupling of the final connection a delay is caused, which depending on the case may last from seconds to a few dozen of them. Also here extra costs are caused for the service offerer, because the accountable connection to the third party has been established before the connection the customer wants is ready.

The object of the invention is to eliminate the drawbacks mentioned above. The particular object of the invention is to set forth a method and system when offering the recall service in countries, where calling abroad is substantially more expensive than calling from the service offerer's own country to the target country, so that by this method and system the service offerer is able to eliminate the formation of the extra connection time that only causes expenditures.

For the characteristic features of the invention reference is made to the claims.

The basic idea of the invention is that an accountable connection is established only after the called C-subscriber has answered the call, whereat the whole connection time can be utilized and the service operator can charge it from the calling A-subscriber. This is carried out according to the invention so that the desired call establishing direction and connections are formed from the public telenetwork by a separate telecommunication connection and after the connections have been established they will be coupled to the public telenetwork.

Thus by the method according to the invention no costs develop for the service operator offering the recall service in any stage of the call formation, which costs could not be charged from the call subscriber.

In the method according to the invention for changing a direction of establishing a telecommunication connection in a telecommunication network, in which telecommunication connections are made between subscribers in different countries, the A-subscriber introduces the telecommunication connection or makes a call to the service point or number of the service offerer to establish a telecommunication or call to a C-subscriber in another country and in which the establishing direction of the telecommunication connection is changed so that the telecommunication connection is formed first from the service offerer to the A-subscriber and further to the C-subscriber. According to the invention another telecommunication connection is established between the A-subscriber's home country and the country defined by the service offerer to establish connections in the desired direction between the A-subscriber, C-subscriber and the service offerer. This other telecommunication connection is preferably formed between the collection node and the service node operated by the service offerer. The service node is generally located where the service offerer operates or in a country that has advantageously priced foreign calls.

In one preferable embodiment the telecommunication connection introduced by the A-subscriber is connected to the collection node, and the C-subscriber's identification from the A-subscriber is received in the collection node. The identification of the A-subscriber and the C-subscriber is transmitted to the service node using another telecommunication connection between the nodes. A third telecommunication connection is established from the service node to the A-subscriber and a fourth telecommunication connection to the C-subscriber, and when the service node receives the answering signal from the C-subscriber, this is informed to the collection node and a connection is established between the A-subscriber and the C-subscriber. In the collection node the A-subscriber's data for the right of use is advantageously checked.

In one embodiment of the present invention the connection from the service node to the A-subscriber is kept in a standby or call-waiting state, until the fourth telecommunication connection between the service node and the C-subscriber has been established. The other telecommunication connection will also be broken, if the connection establishment from the service node to the C-subscriber fails.

The system according to the invention for changing a direction of establishing a telecommunication connection in a telecommunication network, in which telecommunication connections are established between the subscribers in different countries, includes a first terminal device for introducing the first telecommunications connection to the service providers service node in order to establish a telecommunication connection to the other terminal device in another country and in which system the establishing direction of the first telecommunication connection has been arranged as changeable so that the telecommunication connection is established first from the service provider to the first terminal device and further to the other terminal device. According to the invention the system includes the collection node in the location country of the the first terminal device, which is connected to the public switched telephone network. Advantageously the service node and the collection node are either telenetwork exchanges equipped with special software or special features or separate systems connected by normal signalling or speech connections to the telecommunication network.

The invention will be described in the following in detail with reference to the enclosed drawing, in which a network model of the recall service according to the invention has schematically been presented.

The system according to the invention shown in the drawing consists beside the public telecommunication network of two separate node systems or the service node 5 and the collection node 4, a separate telecommunication connection 6 between the nodes and the service software to be adapted in the nodes. The public telecommunication network can be any combination of national or international telecommunication networks, in which it is possible to form telecommunication connections from any place to another place. Both the service node 5 and the collection node 4 are either telenetwork centers or exchanges equipped with special programs or features or separate systems connected by normal signalling or speech connections to the telenetwork. The service node 5 is situated in the service offerer's country M3 and the collection node in the target country M1, in which service is offered to customers and subscribers. The telecommunication connection between the nodes can include for instance a stationary coupled-in 64 kbit/s signalling connection.

The embodiment set forth in the drawing operates more precisely as follows. The customer who has made a deal with the service offerer or here the A-subscriber calls by the terminal device 1 the service call number, by which the call is directed to the collection node 4 of the target country M1. The collection node 4 checks the usufructuary right data of the subscriber in its database and receives from the customer the actual target number to be called or the C-subscriber's number. The collection node 4 transmits the customer's identification, e.g. the subscriber's telephone number, and the target number along the telecommunication connection 6 between the nodes to the service node 5.

The service node 5 initiates separate calls to subscriber C and A-subscriber via network 7 in location M3. The call to the A-subscriber is referenced to as a "call-back" or "recall" because the service node 5 is calling back the A-subscriber after the A-subscriber placed the initial call to the collection node 4. The recall call is placed between network 7 in location M3 and network 7 in location M1 and includes the identification data of the calling subscriber (A-subscriber) that had been previously transmitted from collection node 4 to service node 5 along telecommunication line 6. The recall call to device 1 remains unanswered because the continued connection to collection of device 1 to node 4 maintains device 1 in a standby, call-waiting or "knocking" state.

When the service node receives the answering signal from subscriber C, this information in conveyed to the collection node 4 via dedicated line 6. Thereafter, the collection node 4 releases the device 1 from the call-waiting state whereupon it is connect to network 7 at location M3. A direct communication connection between device 1 of A-subscriber and device 3 of subscriber C is then established and the chargeable connection time begins.

If the time control for the waiting of the C-subscriber's answer is triggered (the called subscriber does not answer) or the C-subscriber is busy, the telecommunication connection process between the nodes, which has guided the calling attempt, will be broken off as also the knocking connection established through the public network according to the normal practices of the telenetwork.

The invention is not restricted to concern only the exemplary embodiments shown above, but many modifications are possible in the scope of the inventional concept defined in the accompanying claims.

What is claimed is:

1. A method for changing direction of establishing a telecommunication connection in a telecommunication network, said telecommunication connection comprising telecommunication links established between subscribers located in different countries, in which method an A-subscriber located in a first country initiates a first telecommunication link to a service point of a service provider in order to establish a telecommunication connection to a C-subscriber located in a second country, and in which method the establishing direction of the telecommunication connection is changed from the first country to the second country so that said telecommunication connection is established first from said service provider to said A-subscriber and further to said C-subscriber, said method comprising the steps of:

establishing said first telecommunication link to a collection node located in said first country;

receiving identifications of the A-subscriber and the C-subscriber in said collection node;

initiating and establishing a second telecommunication link between said collection node and a service node located in a third country defined by the service provider, said second telecommunication link being separate from public telecommunication networks;

transmitting said identifications of the A-subscriber and the C-subscriber to said service node by using said second telecommunication link;

initiating a third telecommunication link from said service node to the A-subscriber;

initiating a fourth telecommunication link from said service node to the C-subscriber;

maintaining said third telecommunication link in a call-waiting state until said fourth telecommunication link has been established;

informing the collection node when the service node receives an answer signal from the C-subscriber; and disconnecting the first telecommunication link and establishing the third telecommunication link so that said telecommunication connection between the A-subscriber and the C-subscriber is established.

2. The method according to claim 1, wherein use of right data of the A-subscriber is checked in the collection node.

3. The method according to claim 1, wherein said second telecommunication link is disconnected if establishing said third telecommunication link fails.

4. A system for changing direction of establishing a telecommunication connection in a telecommunication network, said telecommunication connection comprising telecommunication links established between subscribers located in different countries, said system comprising:

a first system access part located in a first country for connecting to a first terminal device for initiating a first telecommunication link to a service point of a service provider in order to establish a telecommunication connection to a second terminal device located in a second country, the establishing direction of said telecommunication connection arranged as changeable so that said telecommunication connection is established first from said service provider to said first terminal device and further to said second terminal device;

a collection node located in said first country for receiving identifications of the first terminal device and the second terminal device by using said first telecommunication link, said collection node being connected to a public telecommunication network;

a service node located in a third country defined by the service provider for receiving said identifications of the first terminal device and the second terminal device by using a second telecommunication link established between said collection node and said service node separate from public telecommunication networks, for initiating a third telecommunication link from said service node to the first terminal device, for initiating a fourth telecommunication link from said service node to the second terminal device, for maintaining said third telecommunication link in a call-waiting state until said fourth telecommunication link has been established, for informing said collection node when receiving an answer signal from the second terminal device, and for disconnecting the first telecommunication link and establishing the third telecommunication link thus establishing said telecommunication connection between the first terminal device and the second terminal device, said service node being connected to a public telecommunication network.

5. The system according to claim 4, wherein said service node and said collection node comprise one of exchanges and switchboards of said public telecommunication network.

6. The system according to claim 4, wherein said service node and said collection node are separate systems connected to said public telecommunication network by standard signaling and speech connections.

7. The system according to claim 4, wherein the system is used in direct telecommunication between two countries.

8. The system according to claim 4, wherein the system is used in the telecommunication between two countries through a third country.

* * * * *